April 28, 1936. W. H. STRYKER 2,039,124
RUMBLE DECK AND COVER CONSTRUCTION
Filed Dec. 4, 1933 3 Sheets-Sheet 1
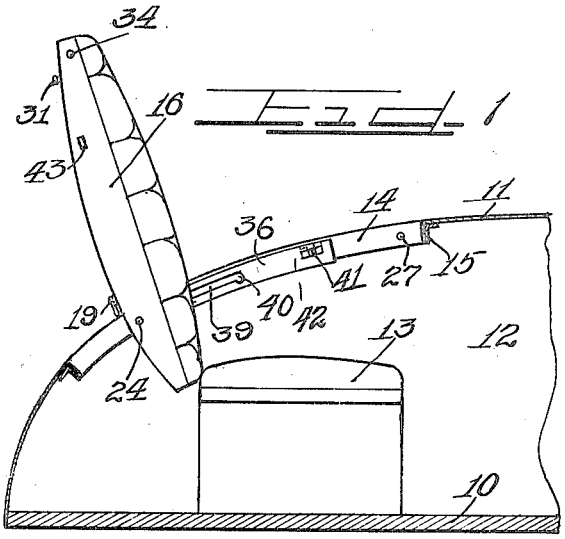
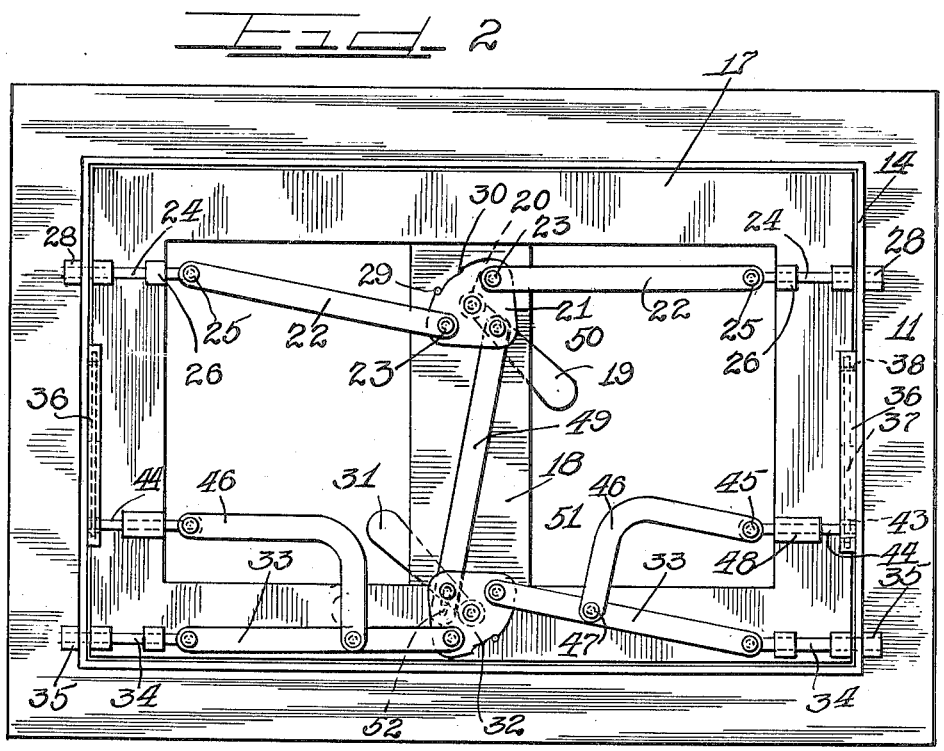
Inventor
William H. Stryker April 28, 1936.  W. H. STRYKER  2,039,124
RUMBLE DECK AND COVER CONSTRUCTION
Filed Dec. 4, 1933   3 Sheets—Sheet 2
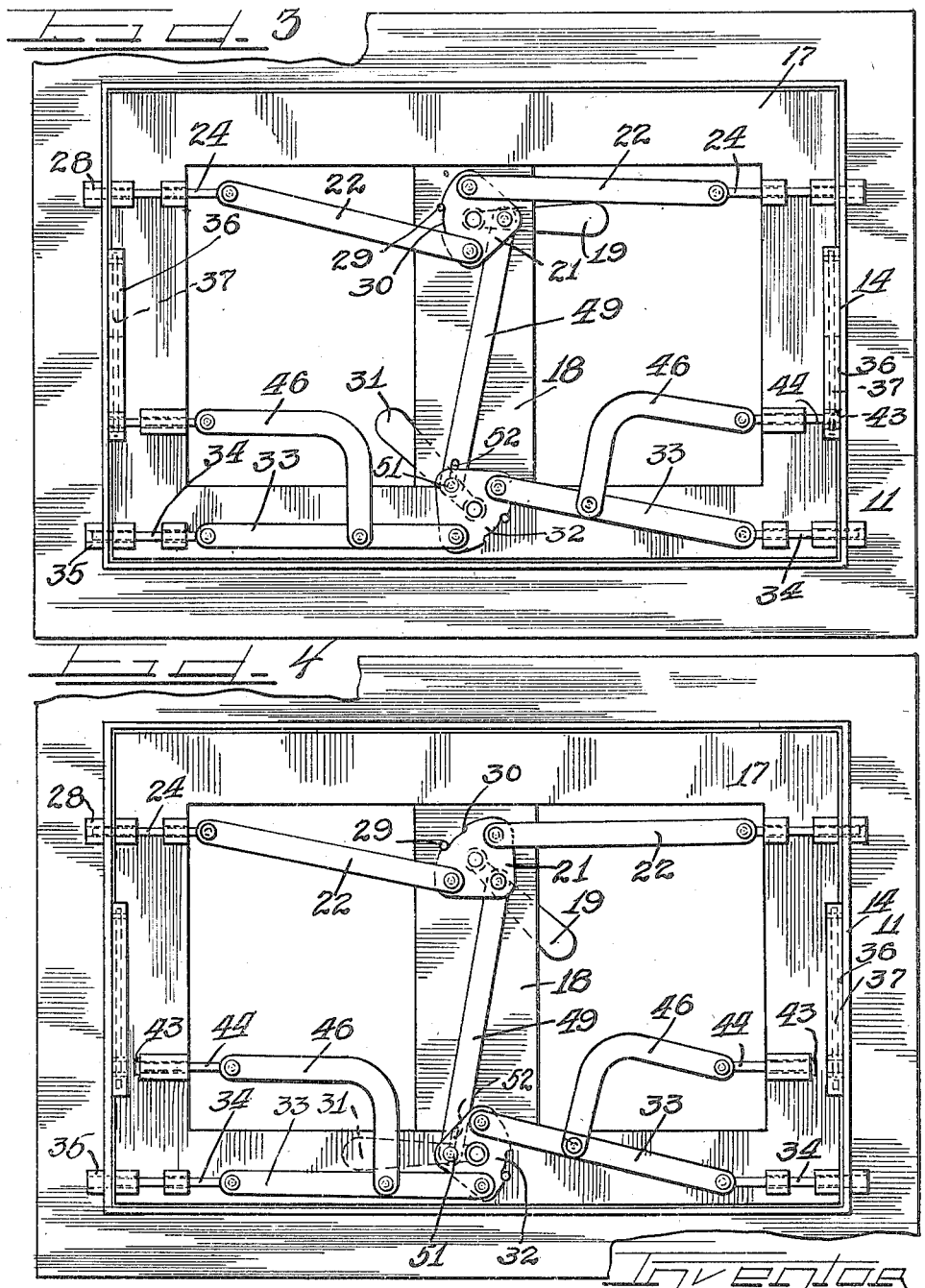

April 28, 1936. W. H. STRYKER 2,039,124
RUMBLE DECK AND COVER CONSTRUCTION
Filed Dec. 4, 1933 3 Sheets-Sheet 3
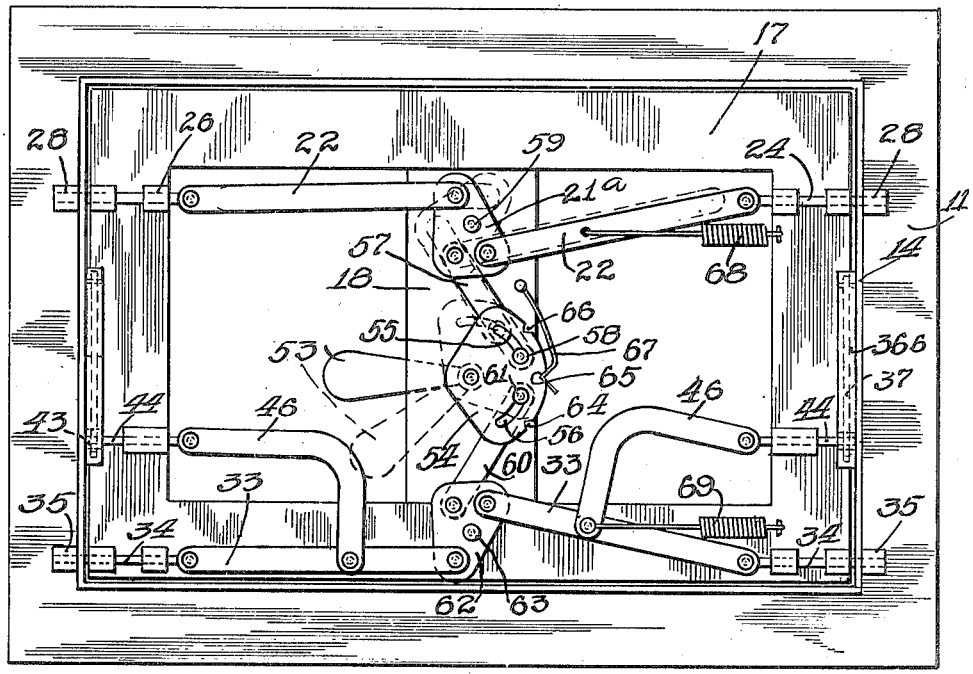
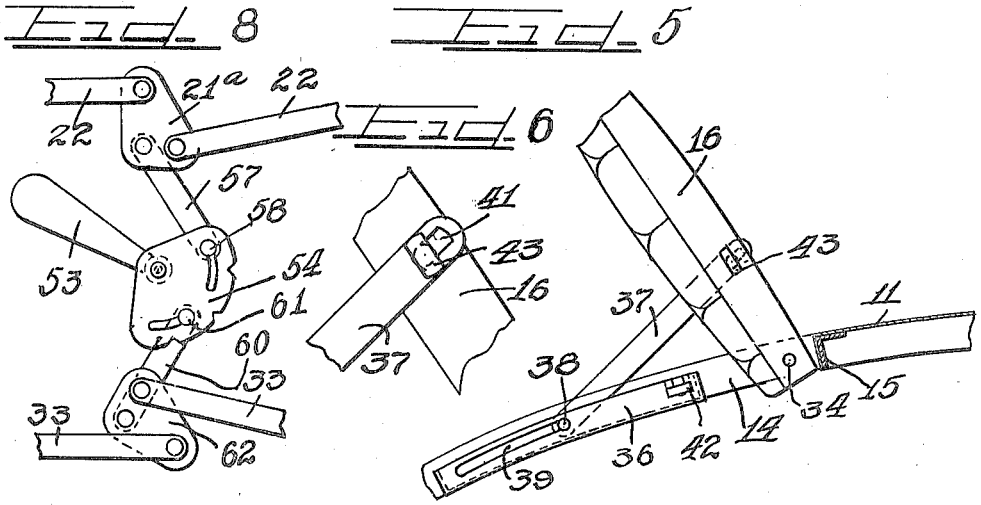
Inventor
William H. Stryker.
by Charles M. Willits Patented Apr. 28, 1936

2,039,124

UNITED STATES PATENT OFFICE 2,039,124

RUMBLE DECK AND COVER CONSTRUCTION

William H. Stryker, Elmhurst, Ill.

Application December 4, 1933, Serial No. 730,801

7 Claims. (Cl. 296—76)

This invention relates to improvements in rumble deck and cover constructions, and more particularly to a deck and cover construction for the rumble compartment of a vehicle wherein the rumble compartment cover may be opened by raising either end thereof, although the invention may be used for various types of closures for many and various purposes as will be apparent to one skilled in the art.

I am aware that, in the past, covers for the rumble compartments of vehicles, and covers for other compartments not associated with vehicles have been made so that the cover might be opened by raising either end thereof, the cover pivoting upon some mechanism adjacent the end not raised. However, these formerly known devices have proven objectionable in many ways, especially when utilized with a rumble seat cover on an automotive vehicle. For example, brace means are highly desirable when a rumble compartment cover is opened back to front in the type of the well-known roadster, while such brace means are not desirable when the cover opens front to back to function as a back rest for the occupant of the rumble seat. In these previous developed devices, where brace means were employed, they were employed for the cover in both positions and were extremely difficult to build in the tonneau adjacent the rumble deck of a vehicle. In other instances, no brace means were used. In further instances, while the rumble cover might be opened from either end, there was nothing to insure that the opposite or closed end of the cover would be in proper adjustment for pivotal movement. In other words, both handles of the door would have to be tested prior to opening the door, or it would, in many cases, be loose at both ends. Difficulty has also been experienced time and again in obtaining a hinge construction that could readily be installed in connection with a rumble cover so as not to become unsightly or not to interfere with the occupant or baggage placed in the rumble compartment.

With the foregoing in mind, it is an object of the present invention to provide a cover for a compartment which may be opened from either end, and which embodies mechanism permitting opening of the cover by actuating the mechanism at either end of the cover without any adjustment at the other end of the cover, the mechanism being such as to insure that the end not opened is ready for pivotal movement of the cover.

It is also an object of this invention to provide a cover for the rumble compartment of a vehicle embodying mechanism permitting the opening of the cover from either end thereof, with all of the mechanism disposed in the cover between the exterior covering and the upholstered seat back, commonly provided on such cover.

A further object of this invention is the provision of a pivotal compartment cover which may be opened from either end, embodying mechanism for both ends of the cover operable from either end of the cover.

Another object of this invention is the provision of a rumble compartment cover openable from either end thereof, including brace means which are unresponsive to movement of the cover in one direction and fail to move to operative position, but which are responsive to movement of the cover in the opposite direction and automatically assume operative position.

It is a further object of this invention to provide a pivotal compartment cover openable from either end thereof, embodying only a single operating handle, the one handle governing the opening of the cover at either end.

Still a further object of this invention is the provision of rumble seat cover mechanism which is durable, easily operable, and may be very efficiently installed in connection with the cover for the rumble compartment of a vehicle, the mechanism when installed being substantially invisible and interfering in no manner with occupancy of the rumble compartment.

While some of the more salient features, characteristics and advantages of the present invention have been above pointed out, others will become apparent from the following disclosure.

The invention includes these and other features of construction and combinations of parts hereinafter described, and shown in a preferred form on the drawings, as more particularly indicated by the claims.

On the drawings:

Figure 1 is a fragmentary vertical sectional view, with certain parts in elevation, illustrating a rumble seat compartment of a vehicle provided with a cover and means embodying principles of the present invention.

Figure 2 is an enlarged bottom plan view, looking from back to front of the vehicle, of the mechanism embodied in the rumble compartment cover and adjacent deck area, the inner skeleton of the cover only being shown with the outer covering and the inner upholstery having been removed for the purposes of clarity. This view, chosen for the purpose of clarity, is that which would appear to an observer having his head lying on the rumble seat with the cover closed, and the top of the head pointing toward the rear of the vehicle.

Figure 3 is a view similar to Figure 2, showing the mechanism in a different state of adjustment.

Figure 4 is a view similar to Figures 2 and 3, showing the mechanism in a still different state of adjustment.

Figure 5 is a fragmentary part-sectional, part-elevational view, similar to Figure 1, showing the cover opened back to front.

Figure 6 is an enlarged fragmentary detail of the brace mechanism as the same is disclosed in Figure 5.

Figure 7 is a view similar to Figures 2, 3, and 4, but showing a slightly modified form of mechanism, wherein only one handle is used to actuate the mechanism for opening the door in either direction.

Figure 8 is a fragmentary diagrammatic view of the mechanism of Figure 7, showing the same in a different position of adjustment.

As shown on the drawings:

In the illustrated embodiment of this invention, there is shown the rear portion of the tonneau of an automobile comprising the flooring 10, and the usual sheet metal deck 11 enclosing the rumble compartment 12. The rumble compartment is provided with the customary rumble seat 13 which, in this instance, may be made removable or adjustable into the forward portion of the compartment in any well known manner so that baggage or other articles may be conveniently stored in the rumble compartment when it is not desired to use the same for passengers.

Of course, an opening is provided in the rumble compartment and in this instance, the opening is defined by an inwardly turned margin 14 of the deck 11, this margin being bent around an angle iron 15 mounted in any well known manner so as to provide sufficient strength for the deck. A cover 16 is provided for the opening in the rumble compartment, and this cover has the usual sheet steel exterior covering, and the interior upholstered surface to function as a back for an occupant of the rumble seat.

The major portion of the mechanism embodied in this invention is preferably, though not necessarily, installed within the cover 16 between the exterior metal coating and the interior upholstered surface upon a suitable cover frame comprising an outer rectangle 17 with an interior cross member 18. The mechanism is substantially flat and may be installed so as to be readily operable in a very small space so that the mechanism need not add to the thickness of the cover 16 in any degree if installed therein.

As seen more clearly in Figures 2, 3 and 4, the mechanism adjacent one end of the cover includes an operating handle 19 disposed externally of the cover and projecting through the outer portion thereof and also through the cross member 18. The shaft of the handle 19 is journalled as at 20 in any suitable manner through the cross member 18 and on the underside of this member is fixed to an actuating plate 21 rotatable with the handle. The actuating plate 21 is preferably triangular in general shape for economy in material and space. Extending in opposite directions, one on each side of the actuating plate 21, is a pair of levers 22 each of which is pivoted to the actuating plate adjacent an apex thereof as at 23. A laterally disposed hinge pin 24 is pivotally connected as at 25 to the outer end of each of the levers 22. These hinge pins are slidable upon movements of the levers in suitable journals 26 mounted on the underside of the frame members 17. When in their extended position, the hinge pins 24 project beyond the covers 16 through suitable apertures 27 (Figure 1) in the margins 14 of the deck 11 into opposed sockets 28 mounted in any suitable manner upon the underside of the deck 11. Obviously, when the hinge pins are in extended position, as seen in Figure 2, they will function as hinges for the raising of the opposite end of the cover 16, and conversely, when the hinge pins are in retracted position, as seen in the upper portion of Figure 3, they permit the respective end of the cover 16 to be raised. To limit the motion of the handle 19 and actuating plate 21, a fixed stud 29 is provided in the cross member 18 and engages with the actuating plate at opposite ends of a recess 30 in the plate.

Adjacent the other end of the cover 16 a second handle 31 is mounted in similar manner to the handle 19 and is connected to a similar but oppositely disposed actuating plate 32 rotatable directly with the handle 31. Pivoted to the plate 32, one on each side of the handle shaft, is a pair of oppositely extending levers 33 similar to the levers 22, and each of these levers 33 has pivotally connected at the outer end thereof, a hinge pin 34 adapted when extended, to engage in a socket 35 mounted on the outer side of the deck 11, all in the manner above described. The rotation of the handle 31 and the plate 32 is also limited in the manner above described in connection with the plate 21.

When the cover 16 is elevated from front to rear into a position to function as a back for an occupant of the rumble seat, no brace means are essential to hold the cover in position, and such brace means would be more or less a nuisance to the rumble compartment passenger. On the other hand, when the cover 16 is opened back to front to permit the ready placing of baggage or other matter in the rumble compartment, bracing means are found desirable to hold the cover in open position. Of course, automatically operable bracing means are preferable, and for the utmost convenience, these bracing means should automatically move into bracing position with the opening of the cover from back to front, and should remain in their original or inoperative position upon the opening of the cover from front to back, without any extra adjustment on the part of the operator.

To this end, a U-shaped channel 36 with closed ends is provided adjacent opposite sides of the cover 16. These channels 36 may, as shown, extend inwardly into the opening to the rumble compartment, and the cover may, as seen in Figures 2, 3 and 4, be cut away to a slight extent, to pass by the channels 36. However, if so desired, these channels may be disposed upon the opposite side of the inwardly turned margin 14 of the deck 11, the margin 14 suitably apertured, and the deck slit in the top thereof to permit movement of the bracing arm to be later described, this being merely a matter of convenience in assembly. As seen more clearly in Figure 5, a bracing arm 37 has a resting place within the pocket of the channel 36. At the rear end thereof, the bracing arm is provided with a cross stud 38 slidable in a slot 39 in the channel 36 when the opposite end of the brace arm is raised. The slot 39 extends forwardly a distance sufficient to permit of the proper elevation of the brace arm and is provided at the forward end thereof with a cam-like recess 40 to receive the cross stud and to hold the braced arm in elevated position, (Figure 1). There may be only one slot 39 on the inner side of the channel 36 or there may be a similar slot in both sides of the channel 36 depending upon which is found most expedient with the desirable rigidity. As seen better in Figure 6, the forward end of the brace arm 37 is provided with a rectangular slot 41 having the same longitudinal axis as the arm. With reference to Figures 1 and 5, it will be seen that the channel 36 is provided with a recess 42 of substantially the same length as the slot 41 and immediately there adjacent.

The aforesaid recess 42 and slot 41 are of a size to receive therein a rectangular head 43 on the outer extremity of the pin 44 pivoted at the other end thereof as at 45 to an angular lever 46 fixed as at 47 to the lever 33. A suitable journal 48 is provided on the frame 17 for slidable movement of the pin 44.

Of course, the brace means structure, together with the lever and pin structure, just above described, is the same for each side of the door, and each lever 33 has fixedly attached thereto an angular lever 46. It is obvious, if so desired, that brace means may be supplied for only one side of the door.

It will be obvious, due to the fixed connection 47 between the angular levers 46 and the levers 33, that upon movement of the handle 31, in a direction to withdraw the hinge pins 34, the pins 44 together with the rectangular head 43 will be withdrawn from engagement with the brace arm so that, when the door is elevated from front to back, the brace arms will lie dormant in the sockets of the channels 36. However, when the hinge pins 34 and the pins 44 are in their advanced positions, and the hinge pins 24 are retracted by movement of the handle 19 and the cover 16 raised from back to front, the pins 44, by their engagement through the slot 41 in the brace arms will elevate the brace arms at one end thereof, causing the cross studs 38 to slide along the respective grooves 39 and engage in the cam recesses 40 at the ends of the grooves to hold the cover in elevated position. As the cover rises, the rectangular heads 43 on the pins 44 will be turned relatively to the slots 41 in the brace arms whereby these parts will not unintentionally disengage. When it is desired to lower the cover, it is simply necessary to elevate the brace arms until the cross studs 38 are removed from the recesses 40, and when the cover is closed, the brace means are automatically restored to their former positions and the pins 44 may be retracted at any time desired.

Means are also provided in the present instance to insure that, when the hinge means adjacent one end of the door are moved into retracted or open position, the hinge means adjacent the opposite ends of the cover, if in closed position, will remain so, and if not in closed or hinging position, will be automatically moved into such position by the movement of the first said hinge means. To this end, a lever 49 is pivoted as at 50 to the actuating plate 21 and as at 51 to the actuating plate 32, it being noted that the lever 49 is engaged with these plates on opposite sides of the pivot points of the plates. It is also to be noted that the lever 49 around the pivot 51 is provided with a lost-motion slot 52 of substantially the same length as the cam recess 30 on the plate 21, or a length equivalent to the maximum movement of the plate 21 and handle 19.

In operation, the present invention is extremely simple, but non the less positive and effective. As seen in Figure 2, the cover 16 is closed, all of the hinge pins 24 and 34 being in hinging position or extended so that they engage in the sockets 28 and 35, respectively. Assuming now that it is desired to open the cover from back to front so that the cover will be in position for ready placing of luggage in the rumble compartment, it is simply necessary to move the handle 19 from the oblique position seen in Fig. 2 to the horizontal position seen in Fig. 3. This movement of the handle rotates the actuating plate 21 until the limit stud 29 abuts the opposite end of the recess 30 in the plate, causing the levers 22 and the hinge pins 24 pivoted thereto to be drawn inwardly or retracted so that the hinge pins are pulled out of engagement with the sockets 28. It will be noted that, during this movement, the lever 49 pivoted to the plate 21 has been raised, but due to the lost motion slot 52 slidable over the pivot pin 51, none of the mechanism adjacent the opposite end of the door has been disturbed but remains in closed position. The cover 16 may then be raised by the handle 19 at the rear end thereof, the cover pivoting upon hinge pins 34 engaged in sockets 35 adjacent the opposite ends of the cover. Of course, the brace actuating pins 44 on the angular levers 46 are disposed a distance away from the pins 34, so that when the cover is raised the pins 44 automatically raise the brace arms 37 in position to support the cover in open position, as previously described herein.

To reclose the cover, it is simply necessary to manually elevate the lower ends of the brace means and drop the cover into closed position. The handle 19 may be moved into oblique position again to restore the pins 24 to hinging position, if so desired. Assuming, however, that the handle 19 has been left in open position after the cover has been closed, and that it is now desired to open the cover from the opposite end thereof, front to back, to function as a back for the occupant of the rumble seat, it is simply necessary to move the handle 31 from the oblique position seen in Figure 2 to the horizontal position seen in Figure 4. This movement of the handle 31 retracts the hinge pins 34 from engagement in sockets 35, and also retracts the pins 44 from engagement with the brace arms 37. It is not necessary to touch the handle 19, which was left in open position. The lever 49 has been drawn downwardly by the movement of the handle 31 and plate 32 causing the plate 21 to rotate to its original closed position, actuating the lever arms 22 outwardly, and advancing the hinge pins 24 into engagement with sockets 28. It is at once apparent that when the handle 31 was moved into open position, the mechanism at the opposite end of the door was automatically placed in hinging position, and the door may be swung open front to back hinging upon the pins 24 engaged in sockets 28.

If the door is now closed, the handle 31 may be moved into closed position without disturbing the mechanism at the opposite end of the cover, since the pivot pin 51 will merely ride up the lost-motion slot 52 in the lever 49, and the mechanism controlled by handle 19 remains in closed position.

However, if the cover is closed and the handle 31 left in open position, a movement of the handle 19 into open position, or to the position seen in Figure 3, automatically moves the mechanism controlled by handle 31 into closed position through the lever 49. Consequently, regardless of whether or not one of the hinge mechanisms has been left in open position, it is impossible to move the opposite hinge mechanism into open position without automatically moving the first hinge mechanism into closed position.

In the event, for any reason, it is desired to remove the cover 16 entirely, it is a simple expedient to open the cover at either end, hold the cover in slightly open position at this end and move the opposite hinge mechanism into open position. Of course, the movement of the opposite hinge mechanism into open position will cause the adjacent hinge mechanism to be moved into closed position, but since the cover is held slightly open, the closing of the adjacent hinge mechanism will occur in open air and the cover may be easily lifted from the deck.

The handles 19 and 31 have been shown in oblique position designating closed position of the hinging mechanisms for the purpose of clarity, it being understood that the handles may be mounted so as to be horizontal or in any other desired position to designate closed positions of the respective mechanisms.

In Figures 7 and 8, I have shown a slightly modified form of the present invention, wherein only one handle is used to actuate the mechanism adjacent either end of the cover 16. This handle is preferably substantially centrally located with respect to the cover.

In the construction shown in Figures 7 and 8, the frame 17 with its cross member 18, the levers 22 with their hinge pins 24, the levers 33 and their hinge pins 34, and the levers 45 together with pins 44, and the bracing arms 37 are all identical with the construction shown in Figures 1 to 6, inclusive. The same principle of actuation of the hinge mechanisms is embodied, and the difference in construction resides mainly in the hinge actuating mechanism.

In this instance, a single handle 53 is employed, and this handle is journalled through the central region of the cross member 18 and fixedly connected to a plate 54 rotatable with the handle. This plate 54 is provided with two oppositely disposed lost-motion slots 55 and 56. A link 57 is operatively connected at one end thereof to the plate 54 by means of a pivot pin 58 freely slidable in the lost-motion slot 55. The other end of this link is pivotally connected to an actuating plate 21a, similar to the previously discussed plate 21, and to which plate the inner ends of the levers 22 are pivotally connected one on each side of the pivot point of the plate. This plate 21a, in this instance, is not connected to a handle, but is merely mounted to rotate around a bearing stud 59 mounted on the cross member 18. In similar manner, another lever or link 60 is pivotally associated at one end thereof with the plate 54 by means of the pivot pin 61 freely slidable in the lost-motion slot 56. The other end of this link 60 is pivotally connected to a plate 62 rotatable upon a stud 63 mounted on a portion of the frame 17.

On opposite sides of the pivot point 63 of the plate 62, the inner ends of the levers 33 are pivotally connected to the plate.

The operation of the construction shown in Figures 7 and 8 is extremely simple. To indicate the position of the handle 53 and to maintain the handle in the desired position, spaced notches 64, 65 and 66 are provided in the plate 54, and these notches are engageable by the end of a spring element 67 mounted upon the cross member 18. The middle notch 65 designates the neutral position of the handle, as the same is seen in full lines in Figure 7, wherein all of the hinge pins 24 and 34 are in hinging position.

Assuming that it is desired to open the cover from back to front for the purpose of readily placing luggage in the rumble compartment, it is simply necessary to move the handle 53 to one side of the neutral position as indicated by the dotted lines in Figure 7. Noting the pivot pins 58 and 61 associated with the levers 57 and 60, respectively, are normally in engagement with the inner ends of the slots 55 and 56, respectively, it will be seen that the plate 54, in its rotative movement, will press against the pivot pin 58 and force the lever 57 to rotate the plate 21a in a manner to retract the hinge pins 24 through the levers 22. This movement is accomplished against the pull of a spring 68 mounted between one of the levers 22 and a portion of the frame 17. The hinge mechanism adjacent the opposite end of the cover will not be disturbed since the lost motion slot 56 will travel freely over the pivot pin 61, and the cover may be swung open hinging on pins 34, the brace arms being elevated into proper position for holding the cover open as hereinabove explained. The handle 53 is maintained in open position by means of the engagement of the detent 67 in the notch 64 of the plate 54.

When it is desired to open the cover from the opposite end thereof, the handle 53 is moved in the opposite direction from neutral position, to that position seen in Figure 8, whereby the lever 60 is forced to rotate the plate 62 and withdraw or retract the hinge pins 34 together with the pins 44 on the levers 46. The hinge pins 24 adjacent the opposite end of the door are not disturbed since the lost-motion slot 55 slides freely over the pivot pin 58. Accordingly, the cover may be raised from back to front pivoting upon the pins 24, and in view of the retraction of the pins 44, the brace arms are not disturbed but lie dormant in their channels 36. The handle is maintained in this open position by engagement of the detent 67 with the notch 66 in the plate 64. Of course, in moving the handle 53 to withdraw the hinge pins 34, the motion is accomplished against the action of the spring 69 mounted between the lever 33 and a portion of the frame 17.

When the cover is closed, the handle 53 is released from whatever position it may be in, and the springs 68 and 69 automatically restore the handle to neutral position with the detent 67 engaged in the notch 65.

From the foregoing, it is apparent that I have provided simple means permitting of the opening of a cover for a compartment by swinging the cover open from either end thereof. The construction is such that hinge mechanism associated with one end of the cover is interconnected with hinge mechanism associated with the opposite end of the cover, and the interconnection is such that it is impossible to open the cover from one end without having the hinging means in hinging position at the other end. In addition, brace arms are provided which automatically are brought into play when desired and automatically eliminated from use when not desired. In addition, it will be seen that the mechanism is substantially flat and may easily be concealed in the cover of a compartment so as to be practically invisible when either end of the cover is in open position, or, if desired, the mechanism may be mounted in the compartment deck adjacent the cover and engage in cover sockets, substantially the reverse to the showing in the drawings.

I am aware that changes may be made and numerous details of construction may be varied through a wide range without departing from the principles of this invention, and I, therefore, do not purpose limiting the patent granted hereon, otherwise than is necessitated by the prior art.

I claim as my invention:

1. In combination with a vehicle rumble deck having an opening therein, a cover for said opening, brace means for holding said cover in open position, and adjusting means associated with said brace means to selectively prepare the latter for operation or inoperation prior to an opening movement of said cover.

2. In combination with a vehicle rumble deck having an opening therein, a cover for said opening swingable into open position, brace means responsive to a movement of said cover to hold said cover in open position, and control means associated with said brace means and operable prior to the opening of said cover for rendering said brace means subsequently operable upon the opening of said cover.

3. In combination with a vehicle rumble deck having an opening therein, a cover for said opening swingable into open position, handle means associated with said cover and operable from the outside of said cover, brace means for holding said cover in open position, and adjusting means associated with said brace means to prepare the latter for operation or inoperation, said adjusting means being controlled by a movement of said handle means relatively to said cover.

4. In combination, a closure having an opening therein, a cover for said opening pivotally associated adjacent an end thereof with said closure, handle means for operating said cover, brace means for holding said cover in open position, and means controlled by said handle means for preparing said brace means for operation when said cover is opened.

5. In combination, a closure having an opening therein, a cover for said opening, hinge means movable into and out of hinging position adjacent each end of said cover to permit said cover to be opened from either end, brace means for supporting said cover when opened from one end, and means responsive to a movement of one of said hinge means to render said brace means operable and inoperable whereby said brace means function when said cover is raised from one end and remain idle when said cover is raised from the other end.

6. In combination with a closure having an opening therein, a cover for said opening, hinge mechanism carried by said cover adjacent each end thereof, said mechanisms being each adjustable into a hinging position in cooperation with said closure adjacent said cover and also being adjustable to a free position from a hinging position to permit said cover to be opened at either end, and brace means associated with one of said mechanisms and adjustable therewith into position for subsequent operation to support the cover in open position when the respective mechanism is moved to hinging position and into inoperative position to lie dormant relatively to the opening of the cover when the respective mechanism is moved into free position.

7. In combination with a closure having an opening therein, a cover for said opening, hinge means associated with said cover adjacent each of a pair of opposed ends thereof to permit said cover to be swung into open position from either of said ends, brace means associated with said cover and adjustable for operation or inoperation upon the opening of said cover, handle means associated with said cover for opening and closing the cover, and control means connecting said handle means with said brace means in such a manner that a movement of said handle means relatively to said cover determines the subsequent operation or inoperation of said brace means.

WILLIAM H. STRYKER.